Sept. 15, 1964       E. W. FLIEDER       3,148,382
FLUSH BALL GUIDE
Filed Oct. 28, 1963
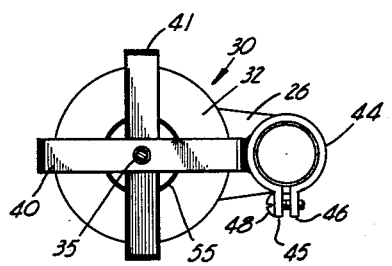
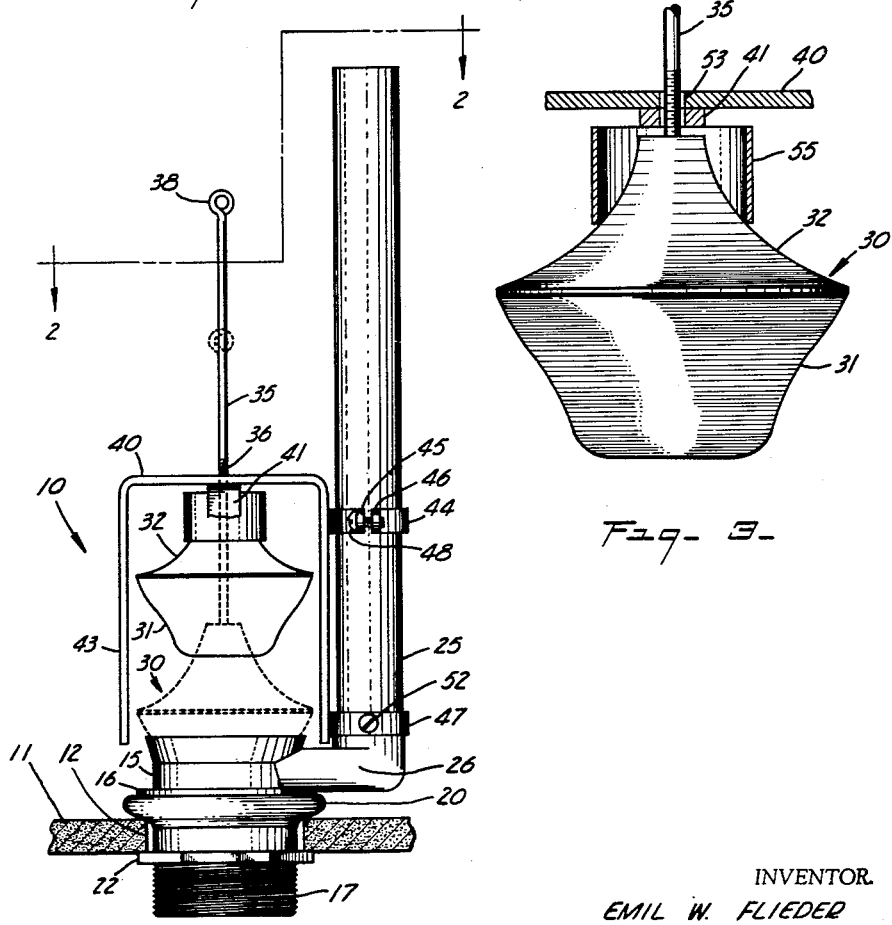
INVENTOR.
EMIL W. FLIEDER
BY
Schroeder & Siegfried
ATTORNEYS

United States Patent Office 3,148,382
Patented Sept. 15, 1964

3,148,382
FLUSH BALL GUIDE
Emil W. Flieder, 513 Haarfager Ave. N., Canby, Minn.
Filed Oct. 28, 1963, Ser. No. 319,380
5 Claims. (Cl. 4—57)

My invention relates to a guide for a flush valve assembly and more particularly to a guide for a ball type valve member of a flush valve assembly which is simple in design and accurately positions the ball valve member to prevent binding and permit proper seating in the closing operation of the flush valve assembly.

While apparatus of this type is known, it has generally lacked uniform application and usage in that it fails to accurately position the ball valve of a flush valve assembly so as to cause binding in the guide to prevent prompt closure and seating of the flush valve assembly parts. The present invention is directed to a simplified design of a guide for a flush valve assembly which is readily adaptable to most flush valve assemblies, may be readily incorporated therewith, and provides for accurate centering of the ball valve member and guiding of the same relative to the valve seat to insure proper functioning of the flush valve assembly.

It is therefore an object of this invention to provide an improved and simplified guide for a flush valve assembly of a toilet.

Another object of this invention is to provide a guide for a flush valve assembly which may be applied to various types of flush valve assemblies.

Still another object of this invention is to provide a guide for a flush valve assembly which may be readily mounted on existing installations.

A further object of this invention is to provide in a guide for a flush valve assembly means for positively centering the ball valve member of the assembly.

The final object of this invention is to provide in a guide for a flush valve assembly a simplified design which is inexpensive to manufacture and simple to install.

These and other objects of this invention will become apparent from a reading of the attached description together with the drawings wherein:

FIGURE 1 is an elevation view of the flush valve assembly with the improved guide thereon, FIGURE 2 is a plan view in section of the flush valve assembly of FIGURE 1, and FIGURE 3 is a sectional view of a portion of the guide of FIGURE 1 with parts broken away.

The improved guide for a flush valve assembly is shown in elevation view in FIGURE 1 with the details of the flush tank and remaining valve structure in the flush tank omitted for simplicity. Thus, as will be seen in FIGURE 1, the numeral 10 is a general designation of the flush valve assembly which is normally mounted in the base of a flush tank, a portion of which is shown in section at 11, through an aperture 12 therein. The flush valve assembly is a conventional part in toilet tanks and normally includes a conventional valve seat member 15 having a flange 16 thereon and the threaded extremity, as at 17, which is adapted to be positioned through the aperture 12 in the flush tank. The valve seat when positioned in a tank, incorporates a sealing ring or gasket 20 which is normally positioned below the flange 16 and bearing against the inner surface of the tank. The gasket 20 fits over the threaded extremity of the seat and is clamped against the base of the tank through a suitable adjusting nut 22 which is positioned against the under surface of the tank and threaded on the threaded extremity 17 of the valve seat. The valve seat is held in position on the inner surface of the tank through the flange 16 and the gasket or sealing ring which is deformed to provide a seal in the base of the tank at the valve seat to prevent leakage around the seat through aperture 12.

Associated with the valve seat of the flush valve assembly is an overflow pipe 25 which is normally positioned to one side of the valve seat for clearance purposes and has a transversely extending portion 26 which connects with the valve seat member below the valving or seating surface thereof. The overflow pipe is offset from the axial center of the valve seat and extends upwardly within the tank with the open extremity of the same normally being positioned slightly above the desired water level in the flush tank (not shown) for overflow protection purposes in a conventional manner.

The flush valve assembly 10 includes in addition a movable valve element, indicated generally at 30, which is normally described as a ball valve member. The valve closure member is normally made of soft rubber and has a seating surface cooperating with the seat of the valve seat member which is normally semi-spherical or conical in form. This valve surface, which is indicated at 31, normally is connected to and integral with a top half of the valve element which is generally conical in form, such as is indicated at 32. This top or upper surface of the ball valve member is normally made of the same material as the seating section but is normally made solid as compared with the lower portion or seating portion which is hollow for flotation purposes and flexible. Attached to the ball valve member is an actuating rod or shaft 35 which has a threaded extremity 36 normally threaded into the top or rigid portion of the ball valve member to mount the same. Shaft 35 includes an eye or connecting loop portion 38 at the opposite extremity thereof by means of which the ball valve member may be connected to an actuating lever for the flush tank (not shown). In conventional flush valve assemblies, this actuating shaft normally extends through and is slidably mounted in a bracket type guide which may be connected to the overflow pipe for the purpose of positioning the ball valve member relative to the seat and slidably mounting the same for actuation by the handle normally connected therewith. Additional guide means have been provided in the past which fit around the sides of the ball valve member such that when it moves in the closing direction toward the valve seat, the guide members will generally locate the same relative to the valve seat.

My improved invention, as shown in FIGURE 1, includes a guide assembly or guide means formed of a pair of elongated guide members 40 and 41 which are bent along the center sections of the same to provide transversely extending arms or extremities which are formed and extend normal to the center section of the members. These guide members 40, 41 are connected together at their midpoints through suitable means, such as welding, and are normally positioned such that the center sections are normal or perpendicular to one another and the extremity portions or arms, indicated at 43, are symmetrically positioned to one another. This guide structure is mounted on the overflow pipe 25 through a pair of band type clamps 44, 47 which are connected to one of the extremities or arm portions 43 of one of the members 40 or 41 and suitably secured thereon such as by welding or riveting. The band 44 has flanges 45, 46 at the extremities thereof through which a metal screw means 48 extends to be threaded into the opposite flange portion for the purpose of securing the band on the overflow pipe 25. The lower band 47 is a continuous loop of such a dimension to fit over and slide on the overflow pipe 25. A screw 52 threaded through the band and bearing against pipe 25 clamps the band 47 thereon to secure the guide structure at this point. If desired, these clamps may be of the same type. The purpose of such clamps is to position and clamp the guide structure relative to the valve seat 15.

The improved guide structure is adapted to be mounted on any overflow pipe of a flush valve assembly and when so mounted, will position the arms 43 of the members 40, 41 such that the ends of the members 40, 41 will be positioned adjacent the edge of the valve seat and symmetrically disposed relative thereto. The ball valve member 30 is positioned within the arm or end portions 43 of the guide structure and the actuating shaft 35 extends through an aperture 53 in the members 40, 41 with suitable clearance therebetween to provide for slidably mounting the shaft therein. Attached to the member 41, as will be seen in FIGURE 3, is a cylindrical guide member 55 which is located concentric with the apertures 53 in the members 40, 41 and is suitably secured on the member 41 through means, not shown. In the raised position of the valve member 30, the top portion 32 thereof engages the circular edge of this cylindrical member 55 which is dimensioned such that it spaces the end of the ball valve member from the guide member 41. This engagement will cause centering of the ball valve member relative to the guide structure of members 40, 41 to prevent any tilting of the ball valve member and the connecting operating shaft 35 in the guide structure. Such tilting causes binding and normally leads to hang-up of the ball valve member in conventional flush assemblies and improper operation of the flush valve assembly. The centering operation provided by cylindrical member 55 insures that in the raised position or actuated position of the flush valve assembly, the ball valve member will be aligned with the valve seat with its operating shaft parallel to the sides of the aperture 53 therein so that the operating shaft may freely slide in the closing movement of the ball valve member onto the valve seat and be positioned thereon through the guiding operation of the ends or extremities 43 of the members 40, 41. Any tapered or symmetrically shaped top surface on a ball valve member will be similarly centered by the guide member 55 with respect to the guide structure of members 40, 41 to prevent hangup of the ball valve member during valve operation.

In the normal operation of the flush valve assembly, the ball valve member 30 will be raised against the pressure of the water within the tank (not shown) through the operation of a lever and linkage connected to the eye or connecting portion 38 of the shaft raising the ball valve member clear of the valve seat and allowing water to drain from the tank. After sufficient water has drained from the tank, the lowering action of the water in the tank will normally move the ball valve member down in a conventional manner in which the valve member floats on and follows the surface of the water until it meets with and mates with the valve seat. The general reason for malfunction of apparatus of this type is the binding of a shaft on a ball valve member in its associated guide during the lowering or valve closing operation. Such binding is normally caused by disalignment between the connecting and actuating parts causing the ball valve member to hang up in the raised position and failing to seat again in the valve seat. In the present invention for an improved guide structure, the ball valve member 30 as it is raised will be centered with respect to the guide structure formed by the members 40, 41 through the operation of the cylindrical guide 55 engaging the symmetrical surface or top of the ball valve member. This will positively align the ball valve member with the aperture 53 in the members 40, 41 such that no binding will occur. The shaft 35 extending from the ball valve member will be centrally located within the aperture 53 and upon drop of the water level in the tank, the ball valve member will be released to move to the valve seat in a conventional manner. The arms or extensions 43 of the members 40, 41 guide the movement of the ball valve member 30 in a closing direction to insure positive seating and in this portion of the closing movement of the valve member.

This improved valve structure may be readily mounted on existing flush valve assemblies since it need only be positioned over the overflow pipe of such a structure and attached thereto and centered with respect to the valve seat. No brackets attached to the valve seat are required and no further alignment of parts is necessary to insure proper operation of the apparatus. This structure is simple in design and economical in cost and permits accurate and reliable operation of the flush ball assembly.

Therefore, in considering this invention, it should be remembered that the present disclosure is intended to be illustrative only and the scope of the invention should be determined only by the appended claims.

I claim:

1. A guide for a flush valve assembly for toilet tanks having a flush valve seat member adapted to be positioned in a flush tank with an overflow pipe connected to the seat member and extending therefrom offset from the axis of the seat with a ball type valve member having a tapered top and an actuating rod attached thereto comprising, a guide means adapted to be connected to the flush valve assembly including a pair of guide members each formed of a narrow flat bar and shaped to have a straight center section with the extremities extending normal thereto, means connecting said guide members at the center sections with the extent of said guide members being perpendicular to one another at the center section, an aperture in the center section of each of said guide members adapted to loosely fit the actuating rod of the ball valve member with the valve member positioned between the extremities of said guide members in close proximity therewith, band type clamp means attached to one of said guide members at one of its extremities, said band type clamp means being adapted to mount said guide means on the overflow pipe such that the extremities of said guide members are uniformly positioned relative to the flush valve seat, and a cylindrical guide member attached to one of said guide members at the center section thereof and positioned concentric with the apertures in the center sections of said guide members concentric with the actuating shaft of the ball valve member, said cylindrical guide member being adapted to engage the tapered top of the ball valve member to center the same within the guide means.

2. A guide for a flush valve assembly for toilet tanks having a flush valve seat member adapted to be positioned in a flush tank with an overflow pipe connected to the seat member and extending therefrom offset from the axis of the seat with a ball type valve member having a tapered top and an actuating rod attached thereto comprising, a guide means adapted to be connected to the flush valve assembly including a pair of guide members each formed of a narrow flat bar and shaped to have a straight center section with the extremities extending normal thereto, means connecting said guide members at the center section with the extent of said guide members being perpendicular to one another at the center section, an aperture in the center section of each of said guide members adapted to slidably mount the actuating rod of the ball valve member with the valve member positioned between the extremities of said guide members in close proximity therewith, a pair of adjustable clamps attached to one of said guide members at an extremity thereof, said adjustable clamps being adapted to mount said guide means on the overflow pipe and adjustably position the guide means relative to the valve seat such that the extremities of the guide members thereof are uniformly spaced from the edge of said flush valve seat and adjacent thereto, and a centering member attached to one of said guide members at the center section thereof and positioned symmetrical with the apertures in the center sections of said guide members and the actuating shaft of the ball valve member, said centering member being adapted to engage the tapered top of the ball valve member to center the same within the guide means.

3. A guide for a flush valve assembly for toilet tanks having a flush valve seat member adapted to be positioned in a flush tank with an overflow pipe connected to the seat member and extending therefrom offset from the axis of the seat with a ball type valve member having a conically shaped top and an actuating rod attached thereto comprising, a guide means adapted to be connected to the flush valve assembly including a pair of guide members each formed of a narrow flat bar and shaped to have a straight center section with the extremities extending normal thereto, means connecting said guide members at the center sections with the extent of said guide members being perpendicular to one another at the center section, an aperture in the center section of each of said guide members adapted to loosely fit the actuating rod of the ball valve member with the valve member positioned between the extremities of said guide members in close proximity therewith, a pair of adjustable band type clamps attached to one of said guide members, an extremity thereof, said pair of adjustable band type clamps being adapted to mount said guide means on the overflow pipe and adjustably position the guide means relative to the valve seat such that the extremities of the guide members thereof are uniformly spaced from the edge of said flush valve seat and adjacent thereto, and a cylindrical guide member attached to one of said guide members at the center section thereof and positioned concentric with the apertures in the center sections of said guide members concentric with the actuating shaft of the ball valve member, said cylindrical guide member being of such dimension that only the top of said ball valve member engages the circular edge of said cylindrical guide member to center the same within the guide means.

4. A guide for a flush valve assembly for toilets having a flush valve seat and cooperating ball type valve member adapted to be positioned within a flush tank with the seat including an overflow pipe connected thereto extending from said seat and axially offset therefrom and with the ball type valve member having a tapered top and an actuating rod attached thereto comprising, a guide including a center section and guide arms extending therefrom translationally from the center section in the same direction, said guide arms being symmetrically spaced from the center section, aperture means in the center section of said guide adapted to mount the actuating rod of the ball valve member and with the ball valve member being positioned within the guide arms of said guide, clamping means attached to one of said guide arms and adapted to position the guide on the overflow pipe of the cross valve assembly with the guide arms being symmetrically positioned with respect to the valve seat and extending to the edge thereof, and a centering member attached to the center section of the guide symmetrical with the aperture therein and adapted to engage the tapered top of the ball type valve member to center the same within the guide arms.

5. A guide for a flush valve assembly for toilets having a flush valve seat and cooperating ball type valve member adapted to be positioned within a flush tank with the seat including an overflow pipe connected thereto extending from said seat and axially offset therefrom and with the ball type valve member having a tapered top and an actuating rod attached thereto comprising, guide means adapted to be connected to the flush valve assembly and including a center section with two pair of diametrically opposed guide members extending therefrom and bent along their extent normal to the center section of the guide means with the guide members extending in the same direction, aperture means in the center section located symmetrical with respect to said guide members and adapted to slidably mount the actuating rod of the ball type valve member with the valve member when positioned thereon being uniformly spaced from said guide members, clamping means attached to one of said guide arms and adapted to position the guide means on the overflow pipe of the flush valve assembly with the guide arms being symmetrically positioned with respect to the valve seat, and a cylindrical centering member attached to the center section of the guide means concentric with the aperture therein and adapted to engage the tapered top of the ball type valve member to center the same within the guide arms.

References Cited in the file of this patent
UNITED STATES PATENTS

| | | |
|---|---|---|
| 2,121,362 | Marten | June 21, 1938 |
| 2,613,366 | Walter | Oct. 14, 1952 |
| 2,688,140 | Schlatter | Sept. 7, 1954 |
| 3,026,536 | Wood | Mar. 27, 1962 |